Aug. 5, 1924.

W. C. THOMAS ET AL 1,503,523

PIPE SUPPORTING SLIP

Filed Nov. 19, 1923

W. C. Thomas
J. C. Dickens
J. W. Fowler

Inventors.

By Jesse R. Stone their Attorney

Patented Aug. 5, 1924.

1,503,523

UNITED STATES PATENT OFFICE.

WILLIAM C. THOMAS, JAMES C. DICKENS, AND JESSE W. FOWLER, OF HOUSTON, TEXAS.

PIPE-SUPPORTING SLIP.

Application filed November 19, 1923. Serial No. 675,573.

*To all whom it may concern:*

Be it known that we, WILLIAM C. THOMAS, JAMES C. DICKENS, and JESSE W. FOWLER, citizens of the United States, residing at Houston, Harris County, Texas, have invented a certain new and useful Improvement in Pipe-Supporting Slips, of which the following is a specification.

Our invention relates to slips for holding pipe in oil well operations, and is particularly adapted for use in gripping and supporting the drill stem on rotary drilling rigs.

It is an object of the invention to provide a compound pipe-engaging slip which is so formed as to engage the seat in the rotary spider centrally of the length of the slip so as to exert an equal grip at all points along the jaws.

It is another object to provide a compound slip all the jaws of which are secured together and hinged to open or close so as to grip or to release the pipe as desired. It is also desired to provide a mechanical device which may be used in operating said slip, whereby the jaws may automatically open as the slips are removed from the pipe, and automatically close when advanced against the pipe.

Figure 3:
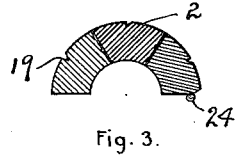
Figure 4:
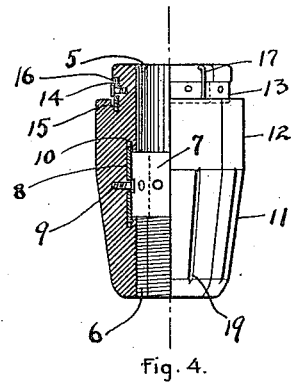
Figure 5:
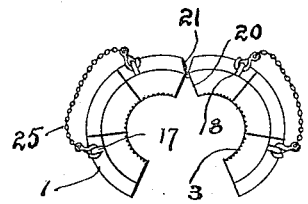
Figure 1:
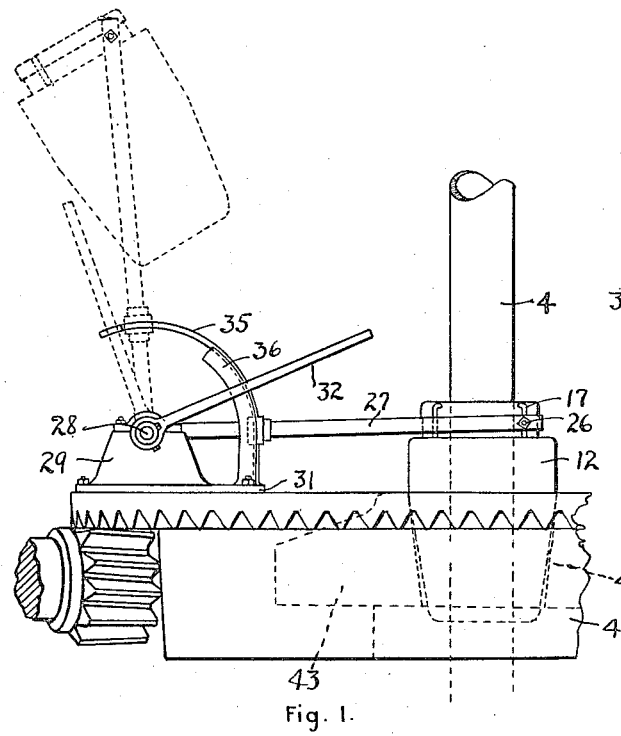
Figure 2:
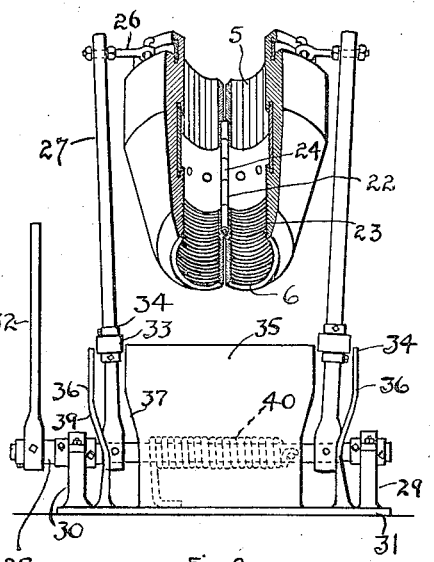

Referring to the drawing herewith, wherein like numerals of reference are employed to designate like parts in all the views: Fig. 1 is a side elevation of the invention shown upon a rotary table. Fig. 2 is a front elevation showing the jaws in elevated position. Fig. 3 is a transverse section of one of said slips. Fig. 4 is a side view, partly in central longitudinal section of the assembled slips. Fig. 5 is a top plan view of the slips with chain handles thereon.

It will be noted from the drawings that there are two cooperating slips 1, each made up of three separate jaws 2. The jaws each have an inner face 3 curved on the circular arc to engage the pipe or drill stem 4. The upper end of the arcuate face is toothed vertically as shown at 5 while the lower end is toothed approximately horizontally, the teeth being cut spirally, as are threads, in the direction to resist the tendency of the pipe to rotate in breaking out the joints.

Each set of three jaws is held together by curved plates 7 fitting in recesses, 8 on the inner faces of the jaws intermediate the ends. The jaws are secured to said plate by pins or set screws 9 fitting through openings in the plate 7 of larger diameter than said screws, whereby the jaws may have a slight play relative to the said plate. The recesses 8 are slightly wider than the plate 7 to allow play and are undercut to receive the plates as shown at 10.

The outer faces of the jaws are tapered along their lower portions 11 and are cylindrical at 12 above the tapered portion. The upper ends are reduced in diameter at 13, and an outer curved plate 14 is fitted in an under-cut annular recess 15 in the reduced portion of each slip, said plate being secured in position by screws 16 which also have a slight play in said plate. On the forward and rear jaws of each set, at the upper end, are staples 17 and 18 respectively to engage with handles. The tapered portion 11 may be cut with a central toothed groove 19 presented forwardly to oppose rotation of the slip in its seat.

The slips are hinged together at one side and, to allow swinging movement the jaws adjacent the hinge, are beveled on each side of said hinge at 20 and 21. The hinge 22 is formed by a central pintle 23 extending through cylindrical projections 24 on the two beveled jaws 1, as shown in Figs. 2 and 5.

The slips may be handled by short chains 25 engaging the staples 17 and 18 on each slip as shown in Fig. 5. It is preferred, for ordinary practice, however, to employ a lever-operated device for that purpose. In this device there is a short rod 26 in the shape of an eye bolt secured in each forward staple 17 in each slip. The outer end of said rod is secured to the forward end of lever arms 27 mounted at their lower ends upon an operating shaft 28 supported for rotation in standards 29 and 30 secured on a base 31. The said shaft is rotatable by means of a hand lever 32. A spring 40 on the shaft 28 tends to assist upward movement of the lever arms 27.

The lever arms 27 are secured to the shaft 28 to allow a slight play laterally thereon and, at a point spaced upwardly from the lower end, are bearing rollers 33 held in position on said lever arms by collars 34 on each side thereof. These bearing rollers 33 fit between a central guide plate 35 and outer guide rods 36. The plate 35 is attached at its lower end to the base 31 and widens out at 37 to provide a cam track for said rollers 33. Said plate is curved away from the pipe 4, as shown in Fig. 1, on an arc of which the shaft 28 is a center. The rods 36 are also curved on the same arc and are bent laterally at 39 to provide a curved track for the rollers 33.

In the operation of the slips the hand lever 32 may be used to raise the slips upwardly into the position shown in dotted lines in Fig. 1. As the arms 27 are raised, the rollers 33 bear against the plate 35 and the cam track 37 tends to throw them apart to spread the slips so that they open on the hinge 24 to release the pipe 4. When the slips are again needed, the hand lever 32 may be used to throw the slips down into the tapered seat 41 in the spider 43 of the rotary 44. As the slips drop, the arms 27 are moved inwardly by the rods 36 to close the slips about the pipe, and the pipe guides the slips into the seat. It will be noted that the tapered seat 41 is not tapered on as sharp an angle as are the lower outer faces 11 of the jaws. The slip makes full contact with the rotary seat only at the upper end of the taper 11, thereof which is about midway of its ends, thereby assuring the operator of an equal gripping pressure on the pipe at both ends of the slip.

The teeth at the upper end of the slip will oppose rotation of the pipe gripped thereby and the teeth at the lower end will bite into and support the pipe. The teeth 19 on the outer side tend to prevent rotation of the slip relative to the seat in the rotary.

The further objects and advantages of our improvement will be obvious to one skilled in the art without further description.

What we claim as new and desire to protect by Letters Patent is:

1. In a device of the character described, a pipe gripping means comprising two slips each made up of a plurality of jaws, said jaws being mounted on central arcuate plates, means whereby said slips are hinged together at one end to allow said slips to open, and teeth on said jaws arranged vertically at one end and horizontally at the other end.

2. In a device of the character described, a pipe gripping device comprising two slips each made up of a plurality of jaws, central arcuate plates upon which the slips are mounted, means to secure said jaws loosely to said plates, a hinge between said slips, and means to handle said slips when thus mounted.

3. A pipe gripping device comprising two slips each made up of a plurality of jaws mounted upon a central arcuate plate, said slips being hinged together at adjacent ends, teeth on each of said jaws to prevent rotation of the pipe and teeth to prevent slipping of the pipe, said jaws each having play relative to said plates, and means to handle said slips.

4. A pipe gripping device comprising two slips each made up of a plurality of jaws mounted upon a central arcuate plate, means to hinge said slips together at one end, arms secured to each of said slips at points away from said hinge, means to move said arms to raise said slips and means to swing said jaws apart as said slips are raised.

5. A pipe gripping device adapted to fit in a tapered seat, comprising two slips each made up of a plurality of jaws having a lower outer face tapered at a sharper angle than said seat so as to engage said seat centrally of said jaws, hinged means holding said slips together and means to handle said slips.

6. A pipe gripping means comprising two slips each made up of a plurality of toothed jaws tapered to fit a tapered seat, hinged means to hold said slips together, arms secured to said jaws at points spaced away from the hinge, means to raise or lower said arms and means including said arms to open and close said jaws.

7. A pipe gripping means comprising two slips each made up of a plurality of separate jaws means to hold said jaws together, a hinge between said slips at one side, arms engaging said slips on the other side, means to raise said arms and means to automatically open and close said jaws as they are raised or lowered.

8. In a device of the character described, a plurality of toothed pipe engaging slips hinged together to open at one side, arms secured to said slips adjacent the open side, means to raise and lower said arms and guide means acting to throw said arms apart as they are moved upwardly to open said slips for the purpose specified.

9. In a device of the character described a plurality of toothed pipe engaging slips hinged together to open at one side, means connected to said slips to raise and lower them and means to automatically open said jaws when they are raised and to close them as they are lowered.

In testimony whereof we hereunto affix our signatures this 16th day of November, A. D. 1923.

WILLIAM C. THOMAS.
JAMES C. DICKENS.
JESS. W. FOWLER.